United States Patent [19]

Stobby et al.

[11] Patent Number: 5,171,757

[45] Date of Patent: Dec. 15, 1992

[54] FIRE RESISTANT VINYLAROMATIC FOAMS

[75] Inventors: William G. Stobby, Johnstown; Kyung W. Suh, Granville, both of Ohio

[73] Assignee: The Dow Chemical Company, Midland, Mich.

[21] Appl. No.: 809,207

[22] Filed: Dec. 13, 1991

Related U.S. Application Data

[63] Continuation of Ser. No. 537,974, Jun. 14, 1990, abandoned.

[51] Int. Cl.$^5$ ................................................ C08J 9/14
[52] U.S. Cl. ........................................ 521/85; 521/88; 521/98; 521/146; 521/139; 521/907; 521/56; 521/60
[58] Field of Search ............... 521/85, 88, 98, 139, 521/146, 907, 56, 60

[56] References Cited

U.S. PATENT DOCUMENTS

| | | |
|---|---|---|
| 3,420,786 | 1/1969 | Weber et al. . |
| 3,595,815 | 7/1971 | Willersinn . |
| 4,069,288 | 1/1978 | Barkhuff, Jr. et al. . |
| 4,281,067 | 7/1981 | Kienzie et al. . |

FOREIGN PATENT DOCUMENTS

| | | |
|---|---|---|
| 203374 | 10/1982 | Czechoslovakia . |
| 1830 | 5/1979 | European Pat. Off. . |
| 2320535 | 11/1974 | Fed. Rep. of Germany . |
| 2353438 | 5/1975 | Fed. Rep. of Germany . |
| 2522141 | 11/1976 | Fed. Rep. of Germany . |
| 2525697 | 12/1976 | Fed. Rep. of Germany . |
| 2603503 | 8/1977 | Fed. Rep. of Germany . |
| 2758236 | 6/1979 | Fed. Rep. of Germany . |
| 2853992 | 7/1980 | Fed. Rep. of Germany . |
| 2950098 | 7/1981 | Fed. Rep. of Germany . |
| 18136 | 2/1974 | Japan . |
| 56-145939 | 11/1981 | Japan . |
| 57-38831 | 3/1982 | Japan . |
| 57-38832 | 3/1982 | Japan . |

OTHER PUBLICATIONS

Chemical Abstracts: CA 93(2):8913r; CA 95(24):204834w, CA 87(24):185432e; CA 102(16):133020c; CA 83(12):98317v.

*Primary Examiner*—Morton Foelak

[57] ABSTRACT

Flame retardant vinylaromatic thermoplastic resin compositions are provided comprising 100 parts vinylaromatic polymer, 0.1 to 2.0 parts of at least one brominated aliphatic compound, 0.5 to 3.0 parts of at least one other and different brominated organic compound having a higher volatilization temperature and greater heat stability than said brominated aliphatic compound and from 0.05 to 5 parts of at least one melt flow promoter.

23 Claims, 1 Drawing Sheet

FIRE RESISTANT VINYLAROMATIC FOAMS

CROSS-REFERENCE TO RELATED APPLICATION

This is a continuation-in-part of application Ser. No. 07/537,974 filed Jun. 14, 1990, now abandoned.

BACKGROUND OF THE INVENTION

The present invention relates to fire retardant or fire resistant vinylaromatic foams.

Over the past several decades, polymer foams have become available in a wide variety of forms, either in answer to a material need in industry or as a developmental expansion of commercialized precursors. Some of the more popular forms of foamed polymer compositions are shapes such as film, sheet, slab and profiles. Generally, these products are produced by extrusion methods in which the polymer is converted by heat and pressure into a homogeneous melt and forced through a die into the desired shape. To obtain a cellular structure, the plastic usually incorporates a blowing agent that decomposes under the heat of the extrusion process and releases gases that cause the shape to expand. It is also possible to inject propellants directly into the melt.

Because of the favorable combination of properties, price and ease of processing, vinylaromatic polymers, especially polystyrenes, are widely used in preparing foam sheet, film and slab for such divergent end uses as packaging, pipe and tubing, construction and insulation. For example, expanded vinylaromatic polymers such as polystyrene are widely used in the insulation of freezers, coolers, truck bodies, railroad cars, farm buildings, roof decks and residential housing. Vinylaromatic polymer foams are also used as the core material for structural sandwich panels use in refrigerated truck bodies, mobile homes and recreational vehicles.

There is an increasing demand for improving the fire retardant properties of materials used in vehicles, the building trades and consumer goods, such as furniture, radio and television cabinets, appliance housings, electrical motor housings, switch boxes and the like. To meet this demand, various steps have been taken to improve the fire retardant properties of thermoplastic polymers in order to make them slower to ignite and to retard flame propagation. Thermoplastic polymers can be rendered flame retardant by compounding with fire retardant additives, including halogenated organic compounds and inorganic compounds such as antimony oxide. Brominated organic compounds have been used in both foamed and nonfoamed vinylaromatic polymer compositions. It is known to use brominated aliphatic compounds, brominated aromatic compounds and combinations thereof in nonfoamed vinylaromatic polymer compositions. "Fire Resistance Finishing of Thermoplastics as Represented by the Example of Polystyrene," CA87(24):185432e, discloses an unfoamed polystyrene composition containing as flame retardants hexabromocyclododecane, nonabromobiphenyl or decabromodiphenyl ether in combination with antimony oxide "Heat and Flame Resistant Thermoplastic Polymers," CA81(12):64729z, discloses a nonfoamed, impact resistant polystyrene having incorporated therein hexabromobenzene, tribromophenyl allyl ether and hexabromocyclododecane.

Several references have suggested combining hexabromocyclododecane and allyl bromoaromatic compounds as fire retardants in foams. "Fire Resistant Polystyrene Foams," CA97(4):24889a, Japanese Patent 57/38831, Mar. 3, 1982, discloses polystyrene foams comprising polystyrene having incorporated therein a tin stabilizer, talc, hexabromocyclododecane, 2,2-bis-(4-allyloxy-3,5-dibromophenyl) propane, dichlorodifluoromethane and methylene chloride. "Flame Resistant Styrene Polymers," CA95(12):98888e, German Offenlegungsschrift 2,950,098, Jul. 9, 1981; and "Fire Resistant Polystyrene Foams," CA97(8):56865f, Japanese Patent 57/38832, Mar. 3, 1982, also disclose foams containing hexabromocyclododecane and allyl bromoaromatic compounds. The allyl bond is known to be energy absorbant. The presence of the allyl ingredient tends to lower the molecular weight of the polystyrene during processing, thereby degrading its strength characteristics, and/or during the flammability test, in particular, thereby allowing more rapid melting of the polymer away from the ignition source. The allyl bond is unstable in the presence of oxygen and peroxides tend to form which attack and sever the polymer backbone. Thus, regardless of what is said about ranges for this component, actual examples will contain relatively low quantities of the allyl bromoaromatic compounds, i.e., around 0.2 parts per 100 parts of vinylaromatic polymer.

While effective in improving flame retardancy, the incorporation of flame retardant additives into thermoplastic polymer compositions is associated with a variety of problems. Such problems include obtaining homogeneous blending of the matrix resin with the fire retardant additives. Failure to obtain a homogeneous blend can contribute to poor fire retardant ratings. There is a further problem in that fire retardant additives tend to degrade the appearance of the product and can negatively affect physical properties such as impact strength, particularly at higher levels of such additives. In nonfoamed polymers, the bromine content is typically quite high, e.g., in excess of 5 parts of bromine per 100 parts of vinylaromatic polymer.

In foamed vinylaromatic polymers, the degree of bromine loading has to be significantly lower to avoid detrimentally impacting the structural qualities and skin quality of the foam. It is common to use only brominated aliphatics in foamed polystyrenes, with hexabromocyclododecane (HBCD) being the most commonly used foamed vinylaromatic polymer fire retardant. Following current industry practice, the use of brominated aliphatic compounds as fire retardants for thermoplastic polymer foams requires an increase in the fire retardant level as the thickness of the foam increases in order to meet industry test standards such as ASTM E-84, discussed in greater detail below.

The increased level of fire retardant additives results in higher material costs for the product and/or difficulty in maintaining an acceptable appearance of the foam outer surfaces or skins. Skin quality can be preserved by going to a higher foam density, which is accompanied by an increase in raw material costs. There is a need for more efficient fire retardant systems for use with thermoplastic vinylaromatic polymer compositions. Additionally, because conventional blowing agents, particularly physical blowing agents such as halogenated hydrocarbons, are considered to be environmentally detrimental, there is a need for flame retardant systems which can function with minimal corrosive effects in pristine expansion systems in which water is at least a component.

SUMMARY OF THE INVENTION

In the present invention, it has been surprisingly found that the fire resistant performance of vinylaromatic polymer foams, especially such foams having a final thickness of 1-4 inches, can be strikingly improved by using a combination of 0.1 to 2 and preferably 0.2 to 1.2 weight percent bromine provided by at least one first brominated aliphatic compound to 100 parts vinylaromatic polymer and 0.5 to 3 weight percent bromine provided by at least one second and different brominated organic compound per 100 parts of vinylaromatic polymer, said second and different brominated organic compound being selected from the group consisting of at least one saturated brominated aromatic compound, at least one brominated compound having an aliphatic ethylenically unsaturated structure wherein the bromine is bonded to the unsaturated carbon atoms, and at least one brominated aliphatic compound wherein the bromine is bonded to a carbon atom which is bonded to a carbon atom which does not have an available proton, said second brominated organic compound having both a lower volatility and a higher thermal stability than the brominated aliphatic compound.

In a more preferred aspect of the invention, from about 0.01 to about 5 parts of at least one melt flow promoter per 100 parts vinylaromatic polymer are incorporated into the system in addition to the brominated aliphatic compound and the saturated brominated aromatic compound. This additional ingredient makes it possible to use less of the first brominated aliphatic compound in order to achieve the same flame retardant results. This has the important advantage of lowering the corrosiveness of the polymer system, which can be an adverse factor during polymer processing, especially when using water as a blowing agent.

These and other objects, advantages and features of the invention can be more fully understood and appreciated by reference to the description of the preferred embodiment.

DESCRIPTION OF THE PREFERRED EMBODIMENT

Figure 1:
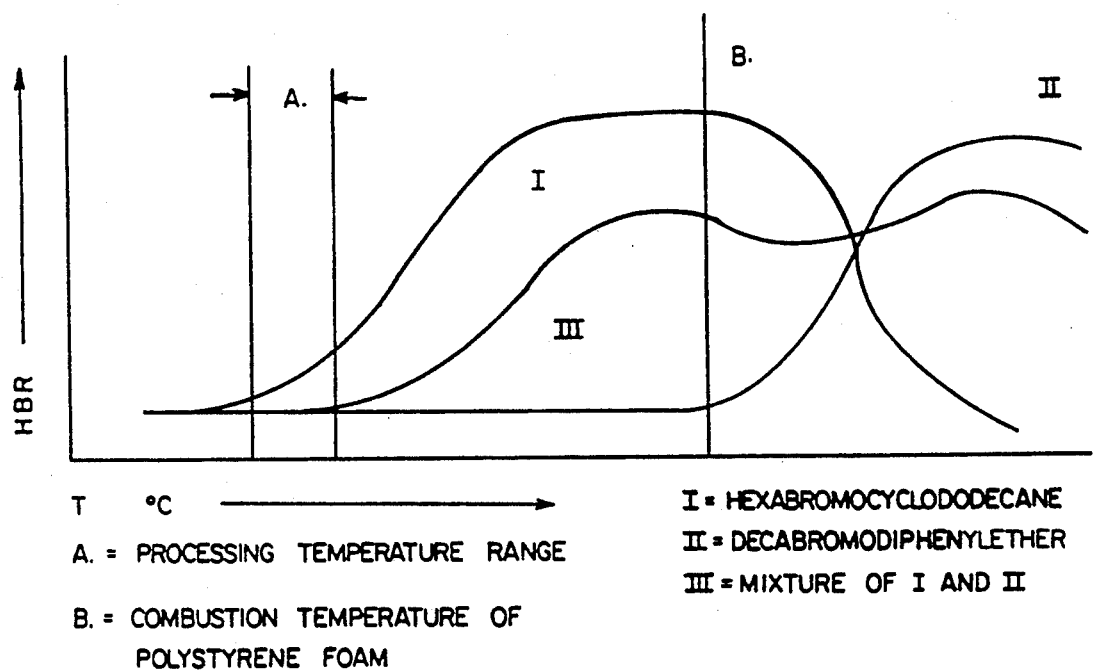
FIG. 1 is a schematic representation of the effect of temperature upon the release of HBr from various brominated organic flame retardant systems.

The invention will be described in detail with respect to the preferred embodiment, which is directed to foamable vinylaromatic polymeric compositions and to shaped products produced from such compositions.

The vinylaromatic polymers which are employed in the present invention are well-known articles of commerce. Vinylaromatic monomers include homopolymers of vinylaromatic monomers, copolymers of two or more vinylaromatic monomers, and interpolymers of at least one vinylaromatic monomer and at least one nonvinylaromatic monomer which is interpolymerizable with vinylaromatic monomers. The vinyl-aromatic monomers have the characteristic formula $CH_2=CX-Ar$, wherein Ar is an aromatic radical, including various alkyl and halo-ring-substituted aromatic units of from to 10 carbon atoms and X is hydrogen or an alkyl group having from 1 to 4 carbon atoms. Representative vinylaromatic monomers include styrene, o-methylstyrene, m-methylstyrene, p-methylstyrene, ethylstyrene, dimethylstyrene, alpha-methylstyrene, p-methoxystyrene, p-chlorostyrene, 2,4-dichlorostyrene, 2,5-dichlorostyrene, p-bromostyrene, alpha-methyl-p-methylstyrene, p-isopropylstyrene, vinylnapthalene, acetanapthalene, vinylanthracene, indene, p-cyanostyrene and the like.

Exemplary of nonvinylaromatic polymers which can be polymerized with vinylaromatic monomers are unsaturated nitriles such as acrylonitrile, methylacrylonitrile, ethylacrylonitrile, and mixtures thereof. Other nonvinyl monomers which are copolymerizable with vinylaromatic monomers and which are suitable for use in the present invention are alpha/beta-unsaturated monobasic acids and derivatives thereof, such as acrylic acid, methacrylic acid, ethylacrylate, butylacrylate, 2-ethylhexlyacrylate and the corresponding methacrylate esters thereof, such as methacrylate, acrylamide, methyacrylamide, maleic anhydride, N-phenylmaleimide, dimethylmaleate, diethylmaleate, dibutylmaleate, the corresponding fumarates and the like.

Currently, it is preferred that the vinylaromatic resins contain at least 50% of at least one vinylaromatic monomer, and it is currently preferred that the vinylaromatic resins contain at least 50 weight percent styrene. Currently preferred vinylaromatic resins include polystyrene and styrene-alpha-methylstyrene copolymers. The vinylaromatic polymers preferably have molecular weights of at least 50,000, and more preferably in the range from 100,000 to 500,000.

The blowing or expanding agents which are employed in the expandable vinylaromatic polymer compositions of this invention include those which have a boiling point lower than the softening point of the expandable polymer composition. The expanding agents include carbon dioxide; nitrogen; aliphatic hydrocarbons such as propane, butane, isobutane, pentane, neopentane, isopentane, hexane, and butadiene; aliphatic cyclohydrocarbons such as cyclobutane, cyclopentane and cyclohexane; and halogenated hydrocarbons such as ethylchloride, methylchloride, methylene chloride, dichlorofluoromethane, chlorotrifluoromethane, dichlorodifluoromethane, chlorodifluoromethane trichlorofluoromethane, 1-chloro-1,1-difluoroethane, 1,1,1,2-tetrafluoro-2-chloroethane and 1,1,1,2-tetrafluoroethane. The expanding agents are typically employed in amounts in the range from 1-30% by weight of the total expandable polymer materials. When employing conventional chemical or physical blowing agents, the halogenated hydrocarbons are preferred expansion agents, with dichlorodifluoromethane, 1-chloro-1,1-difluoroethane and 1,1,1,2-tetrafluoroethane being particularly preferred.

Also, and preferably, the binary and tertiary flame retardant systems of this invention are suitable for use with blowing agent systems which include water. These pristine expansion systems are developing as replacements for the current conventional chemical and physical blowing agents because they are less harmful to the environment and are less hazardous to personnel. The tertiary flame retardant systems (those containing melt flow promoters) are especially suited for use with pristine expansion systems, especially those comprising water, nitrogen and carbon dioxide, perhaps because the tertiary systems enable a reduction in the amount of the more volatile brominated aliphatic flame retardant component and tend to otherwise reduce any tendency toward the formation of corrosive by-products.

The flame retardant systems of the present invention comprise a blend of bromine-containing compounds consisting essentially of at least one brominated aliphatic compound which has at least one hydrogen on a carbon atom adjacent to a bromine-containing carbon atom and at least one saturated brominated aromatic compound, which is less volatile and more heat stable in comparison to the brominated aliphatic compound. Optionally, but preferably, the fire retardant systems of the invention include at least one melt flow promoter.

As the first brominated aliphatic compound, substantially any brominated aliphatic compound which has heretofore been employed as a flame retardant for resin compositions can be employed in the practice of this invention, providing that such compounds (1) have at least one hydrogen atom attached to a carbon atom which is adjacent to a carbon atom containing at least one bromine atom and (2) will volatilize at a temperature below 240 C. Representative brominated aliphatic compounds include hexabromocyclododecane; tris(2,3-dibromopropyl)phosphate; tetrabromocyclooctane; pentabromochlorocyclohexane; 1,2-dibromo-4-(1,2-dibromoethyl)cyclohexane; hexabromo-2-butene; and 1,1,1,3-tetrabromononane. Particularly preferred brominated aliphatic flame retardant compounds include hexabromocyclododecane and its isomers, pentabromocyclohexane and its isomer, and 1,2-dibromo-4-(1,2-dibromoethyl)cyclohexane and its isomers; with hexabromocyclododecane being currently the most preferred compound.

The second component of the fire retardant systems of the invention must meet two criteria: (1) the flame retardant must be more thermally stable and (2) have a volatilization temperature which is higher than the brominated aliphatic compound with which it is combined. As used herein, volatilization temperature is defined as the temperature at which 5 weight percent of a sample has been lost using thermogravimetric analysis (TGA) at a ramp rate of 10° C./mm. Thermal stability is defined as the potential of a brominated compound when compounded into polystyrene to be able to reduce the molecular weight of polystyrene at a temperature of 250° C. Suitable compounds preferably have a volatilization temperature in the range of 160°–460° C. with compounds having a volatilization temperature in excess of 240° C. being particularly preferred.

Brominated compounds wherein the bromine is bonded to unsaturated carbon atoms, aromatic ring structures or aliphatic carbon atoms where there is no available proton on a neighboring aliphatic carbon atom (neopentyl structures) have excellent thermal stability because they do not have the potential to reduce the molecular weight of polystyrene at 250° C. The ability of thermally stable, low temperature volatile compounds to function as second component fire retardant additives is related to the solubility of the compound in the host polymer matrix, the more soluble the compound, the slower is its bromine release rate from the host polymer melt. Thus an aliphatic compound such as tris(tribromoneopentyl) borate is an effective second component fire retardant additive even though its TGA volatilization temperature is below 240° C. The second component fire retardant compounds are preferably selected from the group consisting of diphenyloxides having from 5 to 10 bromine atoms, brominated bicyclic and polycyclic aromatic compounds, thermoplastic resins containing pendant brominated functional groups and bromine compounds containing aromatic carbon-bromine bonds or alkene carbon-bromine bonds, provided that the alkene unsaturation has bromine atoms in substitution for the protons. The resulting structure, —CBr=CBr—, is more stable against peroxide radical formation due to the electro withdrawing effect of the bromine atoms. Alkene structures with bromine are not as thermally stable as aromatic structures with bromine, due to the absence of resonance structures. Brominated thermoplastic resins which can be employed as thermally stable second component fire retardant additives include brominated polystyrene, poly(4-bromostyrene), poly(2,4-dibromostyrene), and poly(2,4,5-tribromostyrene), poly(2,4,6-tribromophenoxymethylacrylate) or copolymers containing above bromostyrene monomers, poly(styrene-co-n-(2,4,6-tribromobenzyl)-maleimide), and poly(styrene-co-tribromoneopentylacrylate) PSTBNPA. This latter compound has 5 weight percent and 10 weight percent TGA loss temperatures of 295° C. and 315° C., respectively. Useful diphenyloxides include those having from 5 to 10 bromine atoms. Such compounds have the structural formula

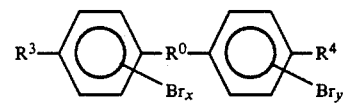

wherein x and y are integers, each is at least 1 and x+y is an integer in the range from 5 to 10; $R^0$ is —O—, —S—, —$R^1CR^2$—, —NH—, or —HCCH3—; $R^1$ is hydrogen or an alkyl group having from 1 to 9 carbon atoms; $R^2$ is hydrogen or an alkyl group having from 1 to 4 carbon atoms; and $R^3$ and $R^4$ can be the same or different and each can be hydrogen, hydroxyl, —O—CH$_2$—CH$_2$—OH, —O—CH$_2$—CHBr—CH$_2$Br, or an alkyl group having from 1 to 4 carbon atoms. Representative second component fire retardant compounds include tribromodiphenyl ether, tetrabromodiphenyl ether, pentabromodiphenyl ether, hexabromodiphenyl ether, tribromochlorodiphenyl ether, tribromodichlorodiphenyl ether, trichlorodiphenyl ether, tetrabromodichlorodiphenyl ether, octobromodiphenyl ether, decabromodiphenyl ether, the 2-ethylhexyl, n-octyl, nonyl, butyl, dodecyl and 2,3-dioxypropyl ethers of tribromophenyl, tribromochlorophenyl and tribromodichlorophenyl. Decabromodiphenyl ether, also known as decabromodiphenyloxide, is particularly useful.

Preferred brominated aromatic compounds are the tetrahalophthalate esters. Useful tetrahalophthalate esters are taught in U.S. Pat. No. 4,762,861, which is incorporated herein by reference. A particularly preferred tetrahalophthalate ester is di[2-ethylhexyl] ester of tetrabromophthalic acid.

The melt flow modifiers which are employed in the practice of the invention are compounds which, by themselves, are capable of reducing the molecular weight of the host vinylaromatic polymer composition. In addition, they are also able to assist in the degradation of the aliphatic fire retardant additive by providing a source of reactive radicals which will abstract protons off the aliphatic flame retardant molecule and subsequently release the bromine radical from the aliphatic fire retardant additive. Good solubility of the melt flow modifier in the host polymer is desired to achieve the best performance. Measurements of molecular loss of the vinylaromatic polymer, e.g., polystyrene, with the melt flow modifier alone is a good indication of the effectiveness of such compounds to function as melt flow modifiers. These compounds contribute to more effective ignition resistance like properties of vinylaromatic polymer compositions by promoting the flowability of the polymer melt during flammability tests. Thus, the melt flow modifiers enhance the capability of the flame retardant systems and enable one to obtain the same level of flame retardancy with a lesser amount of the saturated brominated aliphatic flame retardants. Suitable melt flow modifiers include 2,3-dimethyl-2,3-diphenylbutane; bis(alpha-phenylethyl)sulfone; 1,1'-diphenylbicyclohexyl; 2,2'-dimethyl-2,2'-azobutane; 2,2'-dichloro-2,2'-azobutane; 2,2'-dibromo-2,2'-azobutane; 2,2'-dimethyl-2,2'-azobutane-3,3',4,4'-tetracarboxylic acid; 1,1'-diphenylbicyclopentyl; 2,5-bis(tribromomethyl)-1,3,4-thiadiazole; 2-(bromophenyl-5-tribromophenyl)-1,3,4-thiadiazole; dioctyl tin maleate; and dibutyl tin maleate.

In forming the flame retardant compositions of the present invention, the first aliphatic brominated compound will be employed in an amount sufficient to provide a bromine content in the range of 0.2 to 2, preferably 0.2 to 1, parts by weight per 100 parts by weight of vinylaromatic resin. Henceforth, the amounts of flame retardant materials will be referred to as PHR (parts per hundred parts of resin). The second component, that is, the second brominated organic compound which has a lower volatility and a greater heat stability than the brominated aliphatic compound, is employed in an amount sufficient to provide a bromine content in the range of 0.5 to 3.0 PHR, more preferably 0.8 to 3.0 PHR and most preferably 1.0 to 2.25 PHR. In this regard, volatility is defined by the temperature at which a 5 weight percent loss is observed using thermogravimetric analysis at a ramp rate of 10°/mm. As indicated, the brominated aliphatic compounds representing the first component will typically have volatility values below 240° C. with the lesser volatility materials (second brominated organic compound) having a volatilization temperature in the range of at least 160° C. and preferably above 240° C. The melt flow additives which are preferably employed in the compositions of this invention will be present in the range from about 0.01 to 5 PHR, preferably 0.05 to 1.

Figure 2:
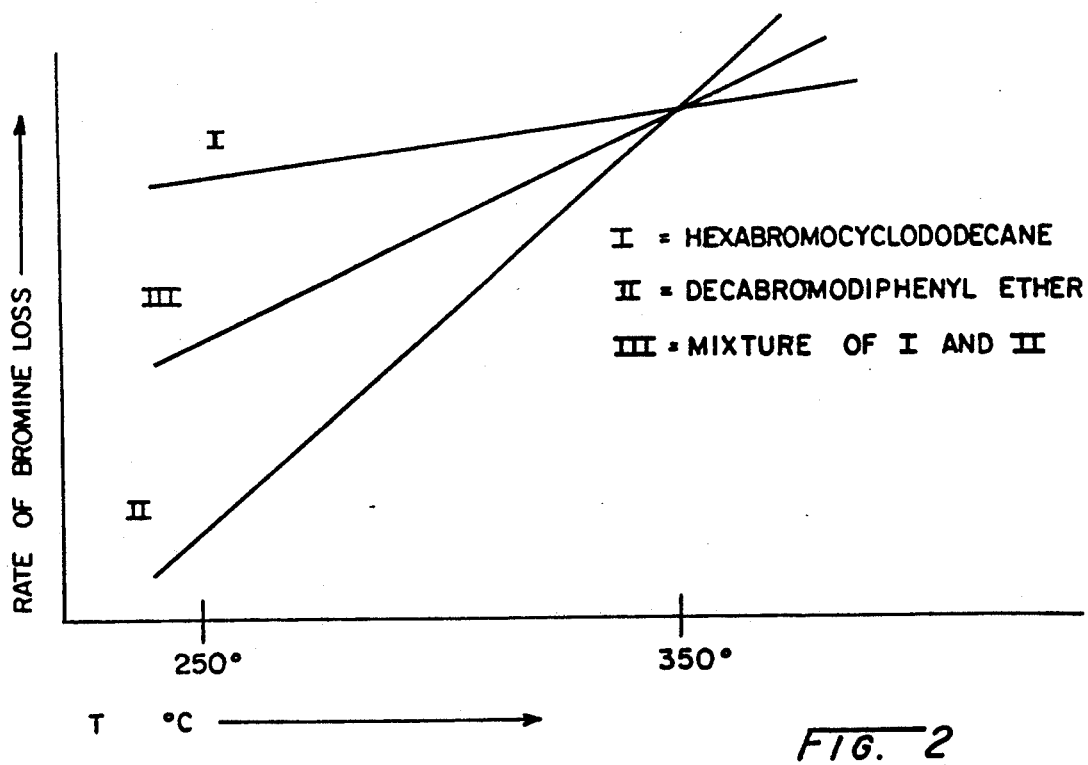
FIG. 2 is a schematic representation of an Arrhenius equation showing the effect of temperature upon the bromine loss from various brominated organic flame retardant systems.

The practical effect of the flame retardant systems of this invention is shown schematically in FIGS. 1 and 2. FIG. 1 is an idealized representation of the release of hydrogen bromide from polymeric compositions containing one or more brominated fire retardant additives as a function of polymer temperature. FIG. 2 is an Arrhenius plot of the rate of bromine loss from bromine-containing compounds as a function of temperature. The more volatile hexabromocyclododecane is partially consumed at polymer processing temperatures and is consumed or volatilized more quickly by the flame. As polymer temperature increases, the release of hydrogen bromide becomes sufficiently rapid that the flame retardant may become totally consumed before it can successfully extinguish the flame. The problem is exacerbated in foams of more than 1-inch thickness. When the foam is ignited, the fire must first melt vertically through the foam from front to back before melting in the horizontal direction can remove the molten polymer from the foam. Thus, higher levels of flame retardant are believed necessary due to the longer exposure time of the foam to the flame. The longer contact time either consumes or volatilizes away a greater portion of the flame retardant. However, the use of a more heat stable, less volatile flame retardant in combination with the more volatile hexabromocyclododecane permits release of hydrogen bromide from the more volatile compound during the initial contact with the flame while retaining the more heat stable, less volatile flame retardant to function at a later stage of flame propagation when the polymer temperature is higher, particularly in the case of foams in excess of 1-inch thickness. By itself, the more heat stable, less volatile flame retardant additive may be so heat stable that its decomposition may not take place until a significant amount of the host polymer is consumed.

For commercial applications, foamed insulation materials must pass the ASTM E-84-80 "tunnel test" which is defined as the standard test method for surface burning characteristics of building materials. The test is conducted in a tunnel-shaped enclosure which is 1 ft.×2 ft.×25 ft. (h×w×l). The foam is attached to the ceiling and a torch is placed under the foam at one end of the tunnel. The test is applicable to any type of building material that, by its own structural quality or the manner in which it is applied, is capable of supporting itself in position or may be supported in the test furnace to a thickness comparable to its recommended use. The purpose of the test is to determine the comparative burning characteristics of the material under test by evaluating the flame spread over its surface when exposed to a test fire and to thus establish a basis on which surface burning characteristics of different materials may be compared, without specific considerations of all the end use parameters that might affect the surface burning characteristics. Smoke density as well as the flame-spread rate is recorded in the test. However, there is not necessarily any relationship between the measurements. The standard is used to measure and describe the properties of materials, products or assemblies in response to heat and flame under controlled laboratory conditions and is not used to describe or appraise the fire hazard or fire risk of materials, products or assemblies under actual fire conditions. However, results of the test may be used as elements of a fire risk assessment which takes into account all of the factors which are pertinent to an assessment of the fire hazard of a particular end use.

The ignition resistance-like properties of the flame retardant vinylaromatic compositions of this invention were tested by a modified version of the ASTM E-84 tunnel test. The modified test is designed to determine the extinguishment time in seconds of thermoplastic foams. In this test, a natural gas or propane flame is positioned under one end of a horizontally positioned sample of plastic foam for 1.5 seconds. The sample measures 6 inches by ¼-inch by 1-inch. A timer is activated when the burner flame is withdrawn and the timer is stopped when the flame extinguishes. The average test time of six samples is given and a maximum value for this test is 25 seconds. Passing criteria is a test time equal to or less than 3.0 seconds with a standard deviation equal to or less than 1.0 second. In these small-scale laboratory tests, bead foam is used because, to pass this modified test, bromine levels similar to the required bromine levels for 2-inch to 2.5-inch thick extruded polystyrene foams are required in order to pass the ASTM E-84 test.

The following examples will further illustrate this invention. The parts specified in the examples are parts by weight. Example I describes the procedure for preparing extruded polystyrene foams containing different flame retardant systems and the flammability test procedure. Examples II–IV report the results of flammability tests of particular flame retardant systems.

EXAMPLE I

Production of Trichlorofluoromethane Imbibed Polystyrene Beads

Trichlorofluoromethane imbibed polystyrene beads were prepared using a Brabender extruder containing a 1174 " screw with a Koch mixer attached at the end of the screw. The temperature profile for the extrusion system was:

| Barrel Zones | | | | Koch Mixer Zones | | | |
|---|---|---|---|---|---|---|---|
| 1 | 2 | 3 | 4 | 1 | 2 | 3 | Die |
| 170° C. | 180° C. | 190° C. | 190° C. | 180° C. | 160° C. | 140° C. | 132° C. |

The preblended mixture of polystyrene and additives was fed into the extruder feed port at a rate of 5.6#/hr and the trichlorofluoromethane was fed in at Barrel Zone 4 at 11 wt. %. The die had an opening of 1/16" and the polymer strand was immediately quenched with water at RMT. The polymer strand was chopped into pellets. The pellets were immersed in preheated water at 60° C. for 40 minutes and dried overnight to improve cell nucleation during first expansion.

Production of Molded Bead Foam

The imbibed beads were first expanded to a bulk density between 1.7 pcf and 2.3 pcf by placing 30 g of beads into a screen basket, already suspended inside a covered cooking pot containing, at the bottom, a 2" layer of continuously boiling water. First expansion time was between 30 and 40 seconds. A bulk density of 2 pcf was aimed for. The expanded beads were removed and allowed to stand overnight before molding. Before molding, the beads were passed through a sieve having ¼" opening.

Into a bead foam mold measuring 6¼"×6¼"×1", 23.0 g of beads were evenly distributed. The 8 psi steam was injected into the filled mold for 105 seconds. Steam supply was shut off and cooling water applied to the exterior surface of the mold. Foaming conditions were varied as needed to achieve a molded bead foam with smooth surfaces with a minimum of small voids between expanded beads. Molded bead foams were allowed to age 48 hours at 72° C./50 RH before measuring density and performing the modified flammability test.

Flammability Testing of Molded Bead Foams

The modified flammability test is designed to determine the extinguishment time in seconds of polystyrene or other thermoplastic foams. A natural gas or propane flame is positioned under one end of a horizontally positioned sample of plastic foam for 1.5 seconds. The sample measures 6"×1"×1". A timer is activated when the burner flame is withdrawn and timer is stopped when the flame extinguishes. The average test time of 6 samples is given and a maximum value for this test is 25 seconds. Passing criteria is a test time of ≦3.0 seconds and a standard deviation of ≦1.0 second.

EXAMPLE II

Preparation of a Vinyl Aromatic Polymeric Foam

Formulations were prepared following the procedure of Example I to evaluate the effect of various levels of bromine, where the only fire retardant additive is hexabromocyclododecane, hereafter referred to as HBCD on modified flammability test results.

Table 1 presents the formulation and results of increasing the level of HBCD in molded polystyrene bead foam. A bromine level of 1.9–2.0 wt. % is needed to meet the passing criteria. Extruded polystyrene foam, Sample G, at 0.74 wt. % HBCD and 2.3 pcf, gives a modified flammability test time of 2.2 seconds. The extruded foam was prepared by changing blowing agents and adding 0.03 pts talc and not using the water cooling bath to chill the polymer strand. Hereinafter, the modified flammability test will be referred to as MFT. In all of the examples, the term DEV refers to the percent deviation in MFT results.

TABLE 1

| SA # | PS680[1] (g) | HBCD (g) | CaSt (g) | CFC-11[2] (g) | Foam[3] Density (pcf) | Bromine (wt %) | MFT (sec) | DEV (sec) |
|---|---|---|---|---|---|---|---|---|
| A | 938 | 62 | 0.7 | 110 | 2.21 | 1.15 | 13.8 | 7.7 |
|   |   |   |   |   | 1.77 | 1.12 | 7.9 | 8.8 |
| B | 907 | 93 | 0.7 | 110 | 2.30 | 1.26 | 4.1 | 2.2 |
|   |   |   |   |   | 1.82 | 1.27 | 3.4 | 1.8 |
| C | 875 | 125 | 0.7 | 110 | 2.18 | 1.76 | 3.1 | 2.8 |
|   |   |   |   |   | 1.78 | 1.78 | 3.2 | 1.7 |
| D | 843 | 157 | 0.7 | 110 | 2.18 | 2.14 | 2.0 | 0.3 |
|   |   |   |   |   | 1.76 | 2.18 | 2.2 | 0.4 |
| E | 810 | 190 | 0.7 | 110 | 2.23 | 2.48 | 1.9 | 0.5 |
|   |   |   |   |   | 1.75 | 2.50 | 1.4 | 0.3 |
| F | 778 | 222 | 0.7 | 110 | 2.18 | 3.23 | 1.8 | 0.4 |
|   |   |   |   | CFC-12/MeCl[4] | 1.77 | 3.17 | 1.5 | 0.2 |
| G | 965 | 35 | 0.7 | 110 | 2.30 | 0.74 | 1.9 |   |

[1]Polystyrene MW = 210M, Mn = 62M
[2]Trichlorofluoromethane
[3]Two different densities were run to demonstrate MFT insensitivity to small density variations between 1.7 to 2.3 pcf
[4]50/50 mixture of dichlorodifluoromethane and methyl chloride Disrupting the continuity of the cell structure in extruded polystyrene foam by using molded bead foam reduces the ability of the sample to melt away from the ignition source. Thus, molded bead foams can be used to model the flammability performance of thicker extruded polystyrene foam using a small-scale flammability test.

EXAMPLE III

Formulations were prepared following the procedure of Example I, employing a combination of brominated diphenyl oxide and hexabromocyclododecane (HBCD). The diphenyl oxides employed were pentabromodiphenyl oxide (PBDPO), octabromodiphenyl oxide (OBDPO) and decabromodiphenyl oxide (DBDPO).

Table 2 presents the formulations and results for blends of brominated diphenyl oxides and HBCD. MFT test results indicate that combinations of the brominated diphenyl oxides and HBCD can provide similar or better MFT test times at equal or less total bromine required for HBCD alone. MFT test times of PBDPO, OBDPO or DBDPO alone demonstrated that none of these fire retardants are effective fire retardants by themselves.

TABLE 2

Effect of PBDPO, OBDPO Or DBDPO and HBCD Combinations on FP-7 Test Results

| SA # | PBDPO (pts) | HBCD % Br | Total % Br | MFT (sec) | DEV (sec) | Density (pcf) |
|---|---|---|---|---|---|---|
| 1 | 1.2 | 0.63 | 1.52 | 2.9 | 1.1 | 2.08 |
| 2 | 1.8 | 0.63 | 2.00 | 3.2 | 2.0 | 2.10 |
| 3 | 0.6 | 1.24 | 1.70 | 2.6 | 1.0 | 2.01 |
| 4 | 1.0 | 1.24 | 1.99 | 2.4 | 0.4 | 2.07 |
| 5 | 1.7 | — | 1.28 | 14.1 | 6.6 | 2.05 |
| 6 | 2.9 | — | 2.17 | 19.2 | 6.9 | 2.00 |
| OBDPO | | | | | | |
| 7 | 1.2 | 0.63 | 1.51 | 8.7 | 9.5 | 2.06 |
| 8 | 1.8 | 0.63 | 2.03 | 2.4 | 0.2 | 2.09 |
| 9 | 0.6 | 1.18 | 1.61 | 10.1 | 4.4 | 1.83 |
| 10 | 1.0 | 1.18 | 1.93 | 2.0 | 0.4 | 2.08 |
| 11 | 3.0 | — | 2.23 | 18.3 | 9.2 | 2.08 |
| DBDPO | | | | | | |
| 12 | 1.2 | 0.63 | 1.52 | 3.2 | 1.4 | 2.04 |
| 13 | 1.8 | 0.63 | 1.97 | 3.4 | 1.4 | 2.02 |
| 14 | 0.6 | 1.24 | 1.78 | 2.2 | 0.5 | 2.05 |
| 15 | 1.0 | 1.24 | 1.99 | 2.1 | 0.6 | 2.03 |
| 16 | 1.5 | — | 1.08 | 18.5 | 10.1 | 1.93 |
| 17 | 2.3 | — | 1.67 | 16.0 | 9.2 | 1.84 |

These results are not intended to reflect the actual performance in a fire.

EXAMPLE IV

Following the procedure of Example I, formulations were prepared using as flame retardant additives a mixture of hexabromocyclododecane (HBCD) and tribromoneopentyl alcohol (TBPA) or tris(tribromoneopentyl) borate (TBPAB).

The purpose of this combination is to demonstrate that the low volatility of the second flame retardant component is essential to this invention. Tribromoneopentyl alcohol shows a 5 wt. % loss at 100° C. and its borate ester at 170° C. The thermal stability of the bromine-carbon bond of either of the above flame retardants is about 100 times more stable than HBCD. Table 3 presents the results of the above-titled combinations. At 0.6% Br as HBCD, the tribromoneopentyl alcohol shows only a marginal effect on the MFT tests. This change could be related to increased plasticization of the foam by the flame retardant. Lowering the volatility by derivatizing the tribromoneopentyl alcohol (TBPA) to its borate ester (TBPAB) improves the MFT test times; compare Samples 18 and 26.

TABLE 3

| SA # | TBPA (pts) | HBCD % Br | Total % Br avg | MFT (sec) | S.D. (sec) | Density pcf (KG/M$^3$) |
|---|---|---|---|---|---|---|
| 18 | 1.3 | 0.6 | 1.59 | 18.7 | 8.5 | 1.66 |
| 19 | 2.0 | 0.6 | 2.10 | 8.8 | 4.3 | 1.78 |
| 20 | 0.7 | 1.2 | 1.71 | 3.0 | 0.9 | 1.94 |
| 21 | 1.0 | 1.2 | 1.94 | 2.3 | 0.7 | 1.91 |
| 22 | 1.0 | — | 0.73 | 21.8 | 5.0 | 1.88 |
| 23 | 1.5 | — | 1.12 | 14.3 | 7.2 | 1.96 |
| 24 | 2.5 | — | 2.03 | 16.5 | 7.7 | 1.96 |
| TBPAB | | | | | | |
| 25 | 0.8 | 0.6 | 1.22 | 4.7 | 0.7 | 1.87 |
| 26 | 1.4 | 0.6 | 1.68 | 3.9 | 1.3 | 1.64 |

EXAMPLE V

Following the procedures of Example I, formulations were prepared employing hexabromocyclododecane (HBCD) and decabromodiphenyl oxide (DBDPO) in combination with a melt flow modifier, 2,2'-dimethyl-2,2'-diphenyl butane (DC).

Table 4 shows the increased thermal stability of the tertiary fire retardant system of 2,2'-dimethyl-2,2'-diphenyl butane, HBCD and DBDPO over HBCD alone to achieve an acceptable ignition resistant-like property of polystyrene foam.

TABLE 4

| SA # | FR System DBDPO | HBCD | DC** | Wt % Br | Foam Dens. (pcf) | MW* (M) | MFT Times (secs)*** |
|---|---|---|---|---|---|---|---|
| 1 | — | — | — | 0.00 | 2.20 | 183 | 25 |
| 2 | — | 0.2 | — | 0.18 | 2.38 | 183 | 21.4 |
| 3 | — | 0.4 | — | 0.41 | 2.48 | 181 | 15.2 |
| 4 | — | 0.6 | — | 0.55 | 2.40 | 179 | 12.4 |
| 5 | — | 0.8 | — | 0.81 | 2.42 | 178 | 10.5 |
| 6 | — | 2.0 | — | 2.08 | 2.45 | 169 | 6.2 |
| 7 | 2.0 | 0.3 | 0.2 | 1.98 | 2.21 | 185 | 3.8 |
| 8 | 2.0 | 0.3 | 0.5 | 1.92 | 2.34 | 185 | 2.9 |

*Weight average molecular weight reported
**2,2'-dimethyl-2,2'-diphenyl butane
***These test times do not reflect this product's performance in a real fire situation Increasing the level of HBCD caused a loss of molecular weight of polystyrene which can be related to a loss of physical properties and increased corrosion in the process especially when the environmentally safe blowing agent water is used. The tertiary system showed no effect at all on the degradation of polystyrene while still maintaining acceptable fire retardant properties. The starting molecular weight of the polystyrene was 193M.

EXAMPLE VI

A copolymer of styrene and tribromoneopentyl acrylate was prepared by solution polymerizing 37 parts by weight styrene and 63 parts by weight tribromoneopentyl acrylate in 100 parts by weight toluene under vacuum in heavy wall glass ampoules. A film was cast from the reaction solution, allowed to dry and then devolatilized at 130° C. for 24 hours. Polymer yield was 86% and bromine content was 22.7 percent by weight as determined by neutron activation. Average weight molecular weight and polydispersity were measured to be 197,500 and 3.07, respectively based on polystyrene. The copolymer has 5 weight percent and 10 weight percent TGA temperatures of 295° C. and 315° C., respectively.

The poly(styrene/tribromoneopentyl acrylate) copolymer was mixed with hexabromocyclododecane to provide a flame retardant system for polystyrene. At 0.3 weight percent bromine from hexabromocyclododecane and 0.3 and 0.7 weight percent bromine from poly(styrene/tribromoneopentyl acrylate), modified funnel test times of 6.5 sec. and 5.0 sec. were obtained, respectively.

Of course, it is understood that the above are merely preferred embodiments of the invention and various changes and alterations can be made without departing from the spirit and broader aspects thereof as set forth in the appended claims.

The embodiments of the invention in which an exclusive property or privilege is claimed are defined as follows:

1. The flame retardant foamed plastic composition comprising:
   100 parts by weight of at least one vinylaromatic thermoplastic resin; and
   a fire retardant system comprising 0.1 to 2.0 parts by weight bromine provided by at least one first brominated organic compound consisting essentially of at least one brominated aliphatic compound, and 0.5 to 3 parts by weight bromine provided by at least one second and different brominated organic compound selected from the group consisting of at least one saturated brominated aromatic compound, at least one brominated compound having an aliphatic ethylenically unsaturated structure wherein the bromine is bonded to the unsaturated carbon atoms, and at least one brominated aliphatic compound wherein the bromine is bonded to a carbon atom which itself is bonded to a carbon atom which does not have an available proton, said second brominated organic compound being more heat stable and less volatile then said first brominated organic compound.

2. A flame retardant composition according to claim 1 wherein said flame retardant system has incorporated therein from 0.001 to 5 parts by weight of at least one melt flow promoter.

3. A flame retardant composition according to claim 1 wherein said second brominated organic compound comprises at least one saturated brominated aromatic compound.

4. A flame retardant composition according to claim 3 wherein said saturated brominated aromatic compound has the formula

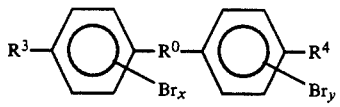

wherein x and y are integers, each is at least 1 and x+y is an integer in the range from 3 to 8; $R^0$ is —O—, —S—, —$R^1CR^2$—, —NH—, or —HCCH3—; $R^1$ is hydrogen or an alkyl group having from 1 to 9 carbon atoms; $R^2$ is hydrogen or an alkyl group having from 1 to 4 carbon atoms; and $R^3$ and $R^4$ can be the same or different and each can be hydrogen, hydroxyl, bromine, —O—CH$_2$—CH$_2$—OH, —O—CH$_2$—CHBr—CH$_2$Br, or an alkyl group having from 1 to 4 carbon atoms.

5. A flame retardant composition according to claim 4 wherein said saturated brominated aromatic compound comprises decabromodiphenyl oxide.

6. A flame retardant composition according to claim 5 wherein said first brominated organic compound comprises hexabromocyclododecane.

7. A flame retardant system composition according to claim 1 wherein said first brominated organic compound comprises hexabromocyclododecane.

8. A flame retardant composition according to claim 7 wherein said second brominated organic compound comprises tris(tribromoneopentyl) borate.

9. A flame retardant composition according to claim 7 wherein said second brominated organic compound comprises a copolymer of styrene and tribromoneopentyl acrylate.

10. A flame retardant composition according to claim 7 wherein said second brominated organic compound comprises octabromodiphenyl oxide.

11. A flame retardant composition according to claim 7 wherein said second brominated organic compound comprises pentabromodiphenyl oxide.

12. A flame retardant composition according to claim 2 wherein said first brominated organic compound comprises hexabromocyclododecane.

13. A flame retardant composition according to claim 2 wherein said second brominated organic compound comprises at least one saturated brominated aromatic compound.

14. A flame retardant composition according to claim 13 wherein said saturated brominated aromatic compound has the formula

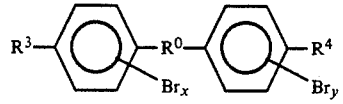

wherein x and y are integers, each is at least 1 and x+y is an integer in the range from 3 to 8; $R^0$ is —O—, —S—, —$R^1CR^2$—, —NH—, or —HCCH3—; $R^1$ is hydrogen or an alkyl group having from 1 to 9 carbon atoms; $R^2$ is hydrogen or an alkyl group having from 1 to 4 carbon atoms; and $R^3$ and $R^4$ can be the same or different and each can be hydrogen, hydroxyl, bromine, —O—CH$_2$—CH$_2$—OH, —O—CH$_2$—CHBr—CH$_2$Br, or an alkyl group having from 1 to 4 carbon atoms.

15. A flame retardant composition according to claim 14 wherein said saturated brominated aromatic compound comprises decabromodiphenyl oxide.

16. A flame retardant composition according to claim 12 wherein said second brominated organic compound comprises decabromodiphenyl oxide.

17. A flame retardant composition according to claim 16 wherein said second brominated organic compound comprises tris(tribromoneopentyl) borate.

18. A flame retardant composition according to claim 16 wherein said second brominated organic compound comprises a copolymer of styrene and tribromoneopentyl acrylate.

19. A flame retardant composition according to claim 16 wherein said second brominated organic compound comprises octabromodiphenyl oxide.

20. A flame retardant composition according to claim 16 wherein said second brominated organic compound comprises pentabromodiphenyl oxide.

21. Flame retardant composition according to claim 1 wherein said second brominated organic compound comprises a tetrahalophthalate ester.

22. Flame retardant composition according to claim 1 wherein said second brominated organic compound provides 0.8 to 3 parts by weight bromine.

23. Flame retardant composition according to claim 1, wherein said second brominated organic compound provides 1.0 to 2.25 parts by weight bromine.

* * * * *